(12) United States Patent
Qin et al.

(10) Patent No.: US 12,018,148 B2
(45) Date of Patent: Jun. 25, 2024

(54) ULTRALOW-GLOSS PC/ABS RESIN COMPOSITION AND PREPARATION METHOD THEREOF

(71) Applicant: SHANGHAI KUMHOSUNNY PLASTICS CO., LTD., Shanghai (CN)

(72) Inventors: Huilin Qin, Shanghai (CN); Qiang Li, Shanghai (CN); Minqi Xin, Shanghai (CN)

(73) Assignee: SHANGHAI KUMHOSUNNY PLASTICS CO., LTD., Shanghai (CN)

( * ) Notice: Subject to any disclaimer, the term of this patent is extended or adjusted under 35 U.S.C. 154(b) by 914 days.

(21) Appl. No.: 17/050,451

(22) PCT Filed: Jan. 18, 2019

(86) PCT No.: PCT/CN2019/072427
§ 371 (c)(1),
(2) Date: Oct. 25, 2020

(87) PCT Pub. No.: WO2020/143078
PCT Pub. Date: Jul. 16, 2020

(65) Prior Publication Data
US 2021/0238412 A1 Aug. 5, 2021

(30) Foreign Application Priority Data
Jan. 9, 2019 (CN) .......................... 201910021004.0

(51) Int. Cl.
| | | |
|---|---|---|
| C08L 69/00 | (2006.01) | |
| B29B 7/20 | (2006.01) | |
| B29B 7/24 | (2006.01) | |
| B29B 7/82 | (2006.01) | |
| B29B 9/06 | (2006.01) | |
| C08L 55/02 | (2006.01) | |
| B29B 7/00 | (2006.01) | |
| C08K 7/16 | (2006.01) | |
| C08L 27/18 | (2006.01) | |
| C08L 79/08 | (2006.01) | |

(52) U.S. Cl.
CPC .............. *C08L 69/005* (2013.01); *B29B 7/20* (2013.01); *B29B 7/242* (2013.01); *B29B 7/82* (2013.01); *B29B 9/06* (2013.01); *C08L 55/02* (2013.01); *B29B 7/005* (2013.01); *C08K 7/16* (2013.01); *C08L 27/18* (2013.01); *C08L 79/08* (2013.01)

(58) Field of Classification Search
CPC ..... C08L 69/005; C08L 55/02; C08L 2205/18
See application file for complete search history.

(56) References Cited

U.S. PATENT DOCUMENTS

| | | | | |
|---|---|---|---|---|
| 3,283,036 A | * | 11/1966 | Larson ................. | C09D 133/06 528/937 |
| 3,859,120 A | * | 1/1975 | Schramm ............. | C09D 133/10 428/421 |
| 5,223,573 A | * | 6/1993 | Kuruganti ............... | C08L 69/00 525/70 |
| 10,487,206 B2 | * | 11/2019 | Zhou ........................ | C08L 35/06 |
| 2005/0228130 A1 | * | 10/2005 | Kalyanaraman ........ | C08L 69/00 525/67 |
| 2021/0238412 A1 | * | 8/2021 | Qin ........................ | B29B 7/726 |

FOREIGN PATENT DOCUMENTS

| | | | | | |
|---|---|---|---|---|---|
| CN | 100497446 C | * | 6/2009 | ............ | C08F 291/00 |
| CN | 106751681 A | * | 5/2017 | | |
| CN | 107674396 A | * | 2/2018 | ............. | C08L 69/00 |
| CN | 114316551 A | * | 4/2022 | | |

OTHER PUBLICATIONS

Written Opinion of the International Searching Authority of Application PCT/CN2019/072427 (Year: 2019).*
Google Translation of CN 107541045 A (Year: 2024).*

* cited by examiner

*Primary Examiner* — Michael M Dollinger
(74) *Attorney, Agent, or Firm* — Bayramoglu Law Offices LLC

(57) ABSTRACT

An ultralow-gloss polycarbonate/acrylonitrile-butadiene-styrene (PC/ABS) resin composition and a preparation method thereof are provided. The composition includes the following components: 40-80 parts by weight of bisphenol A polycarbonate, 19-40 parts by weight of acrylonitrile-butadiene-styrene graft copolymer, 1-20 parts by weight of ultralow-gloss toughening modifier, and 0.1-5 parts of processing aid. The ultralow-gloss toughening modifier includes the following components: post-treated polymeric microspheres, a low-temperature toughening agent, a coupling agent, and aid. The preparation method of the composition includes: fully mixing all components in a high-speed mixer to obtain a mixture; feeding the mixture into a main feed port from a twin-screw extruder, melting, extruding, cooling, drying, and pelletizing. The PC/ABS resin composition prepared by the present invention has extremely low gloss level and excellent impact toughness, and it can be applied in scenarios requiring low temperature resistance and low gloss level.

15 Claims, No Drawings

ULTRALOW-GLOSS PC/ABS RESIN COMPOSITION AND PREPARATION METHOD THEREOF

CROSS REFERENCE TO THE RELATED APPLICATIONS

This application is the national phase entry of International Application No. PCT/CN2019/072427, filed on Jan. 18, 2019, which is based upon and claims priority to Chinese Patent Application No. 201910021004.0, filed on Jan. 9, 2019, the entire contents of which are incorporated herein by reference.

TECHNICAL FIELD

The present invention relates to the technical field of polymer materials, and in particular to an ultralow-gloss polycarbonate/acrylonitrile-butadiene-styrene (PC/ABS) resin composition and a preparation method thereof.

BACKGROUND

PC/ABS alloy materials have the advantages of both PC and ABS and excellent mechanical and processing properties, and are widely used in fields of automobiles, electronics, communications and chemical industry. PC/ABS alloy materials are especially popular in the automotive consumer market in recent years due to the need of light weight of automobiles call for using plastic instead of steel.

In order to avoid a hidden danger caused by the strong stimulation of drivers resulting from light reflection, automotive interior trim parts generally adopt the matting treatment to minimize the gloss of the interior trim parts. In general, there are usually three ways to reduce the gloss of interior trim parts: spraying, changing the surface texture of the interior trim parts, that is, using texture processing, or directly selecting low-gloss resin injection molding. Spraying matt paint is the most effective way to improve the gloss of interior trim parts, but it pollutes the environment and has a certain defect rate. Another effective way to improve the gloss of interior trim parts is to texture the interior trim parts; however, sometimes due to the high gloss of the selected material per se, this texture processing would result the interior trim part with unsatisfactory gloss, which puts limit to the designs of the interior trim parts.

PC/ABS alloy materials are important raw materials for interior trim parts. In order to further improve the application of PC/ABS alloy in automotive interior trim parts, it is necessary to develop low-gloss PC/ABS alloy materials. Currently, low-gloss PC/ABS uses the addition of incompatible materials or reactive resins, which effectively reduce the gloss, but undermines the integrity of the part, for example, the seriously affects the toughness of the material, influences the normal use of products and limits the influence of PC/ABS materials. Therefore, there is an urgent need for an ultralow-gloss PC/ABS alloy material that does not undermine the toughness of the material.

SUMMARY

In view of the deficiencies in the prior art, the present invention provides an ultralow-gloss PC/ABS resin composition and a preparation method thereof. The ultralow-gloss PC/ABS resin greatly improves the low-temperature impact resistance and substantially reduces material gloss.

The objective of the present invention is achieved by the following technical solutions:

The present invention provides an ultralow-gloss PC/ABS resin composition, including the following components:

| | |
|---|---|
| bisphenol A polycarbonate | 40-80 parts by weight, |
| acrylonitrile-butadiene-styrene graft copolymer | 19-40 parts by weight, |
| ultralow-gloss toughening modifier | 1-20 parts by weight, and |
| processing aid | 0.1-5 parts by weight. |

Preferably, the bisphenol A polycarbonate has a relative molecular weight of 17,000-30,000 g/mol, a glass transition temperature of 140-150° C., and a terminal hydroxyl group content of 10%-20%.

Preferably, the acrylonitrile-butadiene-styrene graft copolymer has a butadiene content of 10-55% by weight, an acrylonitrile content of 15-32% by weight, and a styrene content of 30-70% by weight; and the acrylonitrile-butadiene-styrene graft copolymer has a weight average molecular weight of 100,000-180,000 g/mol.

Preferably, the ultralow-gloss toughening modifier includes the following components:

| | |
|---|---|
| post-treated polymer microspheres | 50-80 parts by weight, |
| low-temperature toughening agent | 15-30 parts by weight, |
| coupling agent | 5-20 parts by weight, and |
| processing aid | 0.1-5 parts by weight. |

Preferably, the polymer microspheres are high performance special polymer microspheres, which are at least one selected from the group consisting of polytetrafluoroethylene (PTFE) microspheres, polyamide-imide (PAI) microspheres, polyetherimide (PEI) microspheres, and poly(p-phenylene terephthalamide) (PPTA) microspheres; the polymer microspheres have a diameter of 0.8-2μ.

Preferably, the post-treated polymer microspheres are polymer microspheres obtained after the plasma treatment.

Preferably, the method for plasma treatment includes: etching the polymer microspheres through a plasma reactor under a reactive gas atmosphere by 0.5-2.0 wt %, and holding etched microspheres in the air for 1-5 min. In order to prevent over-etching from damaging the performance of materials, the weight loss rate of the polymer microspheres should be controlled at 0.5-2.0%, and the parameters such as pulse, two-stage voltage, and processing time in the plasma reactor are regulated by the weight loss rate.

Preferably, the reactive gas is selected from the group consisting of oxygen, nitrogen and ammonia.

Preferably, the low-temperature toughening agent is a non-crosslinking reactive toughening agent, and the coupling agent is a silane coupling agent.

Preferably, the non-crosslinking reactive toughening agent includes one or more selected from the group consisting of EMA-g-MAH, EMA-g-GMA, EBA-g-MAH, EBA-g-GMA and thermoplastic styrene elastomer grafting active functional groups;

the silane coupling agent includes one or more of amino functional silane coupling agent, vinyl functional silane coupling agent, epoxy functional silane coupling agent and methacryloyl functional silane coupling agent.

Preferably, the processing aid includes at least one selected from the group consisting of an antioxidant, a lubricant and a light stabilizer.

Preferably, the antioxidant is at least one selected from the group consisting of hindered phenolic and phosphite antioxidants.

Preferably, the lubricant is at least one selected from the group consisting of an alkyl silicone oil, a polyolefin wax, an oxidized polyolefin wax, a pentaerythritol ester, a fatty acid ester and an amide wax lubricant.

Preferably, the light stabilizer is at least one selected from the group consisting of a salicylate, a benzophenone, a benzotriazole or a substituted triazine ultraviolet absorber, and a hindered amine radical scavenger.

Preferably, a method for preparing the ultralow-gloss toughening modifier includes the following steps:
weighing the components in parts by weight, thoroughly mixing well and homogenizing the components to obtain the ultralow-gloss toughening modifier.

More preferably, the mixing is conducted at 200-300° C. for 10-30 min.

The present invention further provides a method for preparing an ultralow-gloss PC/ABS resin composition, where the method includes the following steps:
step 1, preparing materials according to the following components and contents: 40-80 parts by weight of bisphenol A polycarbonate, 19-40 parts by weight of acrylonitrile-butadiene-styrene graft copolymer, 1-20 parts by weight of ultralow-gloss and low temperature resistant modifier, and 0.1-5 parts by weight of processing aid;
step 2, stirring and mixing well-prepared materials in step 1 in a high-speed mixer, and extruding and granulating to obtain the ultralow-gloss PC/ABS resin composition;

Preferably, in step 2, a twin-screw extruder used in the extrusion has a screw length-to-diameter ratio of 36-44, and the twin-screw extruder is provided with a temperature control device and an evacuation means.

Preferably, in step 2, the twin-screw extruder has an extrusion temperature of 230-280° C. and a screw speed of 300-800 rpm.

Compared with the prior art, the present invention has the following beneficial effects:
1. The composition of the present invention innovatively uses high performance special polymer microspheres, which are processed at a softening-temperature of high performance specialty polymers, so that the polymer microspheres remain undeformed during processing; moreover, the polymer microspheres will be enriched on the surface during processing, and a rough surface is formed to reduce gloss due to the difference in response of volume to temperature during the cooling of the polymer alloy;
2. The composition of the present invention conducts plasma treatment on high performance special polymer microspheres, and the innovative use of polymer microspheres is to obtain more surface polar groups than inorganic fillers; the roughness of the polymer microspheres and the polar groups on the surface (such as hydroxyl groups) can be increased by plasma treatment; the bonding strength between the polymer microspheres, the reactive toughening agent, and the coupling agent can be significantly improved through the reaction, thereby avoiding the decrease of the toughness of the material.
3. The composition of the present invention uses a non-crosslinking reactive toughening agent, and the reactive toughening agent is preferentially reacted with the plasma-treated polymer microspheres and the coupling agent through an internal mixer. Thus, the toughening agent is enriched in the outer layer of the polymer microspheres to form large rubber particles that are more liable to cavitation, so that the resulting composition, in addition to having an extremely low surface gloss, increases the low temperature impact relative to conventional PC/ABS.
4. The PC/ABS resin composition prepared by the present invention has extremely low gloss and has excellent low temperature resistance, and if it replaces the mold processing technology such as graining and texturing, it will substantially save the mold cost and the processing production cost; it is well suited in some scenarios requiring low temperature resistance and low gloss, such as automobile parts, outdoor profiles, building materials and electrical appliances.

DETAILED DESCRIPTION OF THE EMBODIMENTS

The present invention will be described in detail below in combination with examples. The following examples are intended to help those skilled in the art further understand the present invention, but they are not intended to limit the present invention in any way. It should be noted that several variations and improvements can also be made by one of ordinary skill in the art without departing from the conception of the present invention. These are all within the scope of protection of the present invention.

The present invention provides an ultralow-gloss PC/ABS resin composition, including the following components:

| | |
|---|---|
| bisphenol A polycarbonate | 40-80 parts by weight, |
| acrylonitrile-butadiene-styrene graft copolymer | 19-40 parts by weight, |
| ultralow-gloss toughening modifier | 1-20 parts by weight, and |
| processing aid | 0.1-5 parts by weight. |

The bisphenol A polycarbonate has a relative molecular weight of 17,000-30,000 g/mol, a glass transition temperature of 140-150° C., and a terminal hydroxyl group content of 10%-20%. The acrylonitrile-butadiene-styrene graft copolymer has a butadiene content of 10-55% by weight, an acrylonitrile content of 15-32% by weight, and a styrene content of 30-70% by weight; and the acrylonitrile-butadiene-styrene graft copolymer has a weight average molecular weight of 100,000-180,000 g/mol.

The ultralow-gloss toughening modifier includes the following components:

| | |
|---|---|
| post-treated polymer microspheres | 50-80 parts by weight, |
| low-temperature toughening agent | 15-30 parts by weight, |
| coupling agent | 5-20 parts by weight, and |
| processing aid | 0.1-5 parts by weight. |

The polymer microspheres are high performance special polymer microspheres, which are at least one of PTFE microspheres, PAI microspheres, PEI microspheres, and PPTA microspheres; the polymer microspheres have a diameter of 0.8-2μ.

The post-treated polymer microspheres are polymer microspheres obtained after the plasma treatment.

The method for the plasma treatment includes etching the polymer microspheres through a plasma reactor under a reactive gas atmosphere by 0.5-2.0 wt %, and holding etched microspheres in the air for 1-5 min. In order to prevent over-etching from damaging the performance of materials, the weight loss rate of the polymer microspheres should be controlled at 0.5-2.0%, and the parameters such as pulse, two-stage voltage and processing time in the plasma reactor are regulated by the weight loss rate.

The reactive gas is selected from the group consisting of oxygen, nitrogen and ammonia.

The low-temperature toughening agent is a non-crosslinking reactive toughening agent, and the coupling agent is a silane coupling agent.

The non-crosslinking reactive toughening agent includes one or more selected from the group consisting of EMA-g-MAH, EMA-g-GMA, EBA-g-MAH, EBA-g-GMA and thermoplastic styrene elastomer grafting active functional groups;

the silane coupling agent includes one or more selected from the group consisting of amino functional silane coupling agent, vinyl functional silane coupling agent, epoxy functional silane coupling agent, and methacryloyl functional silane coupling agent.

The processing aid includes at least one selected from the group consisting of an antioxidant, a lubricant, and a light stabilizer.

The antioxidant is at least one selected from the group consisting of hindered phenolic and phosphite antioxidants.

The lubricant is at least one selected from the group consisting of an alkyl silicone oil, a polyolefin wax, an oxidized polyolefin wax, a pentaerythritol ester, a fatty acid ester and an amide wax lubricant.

The light stabilizer is at least one selected from the group consisting of a salicylate, a benzophenone, a benzotriazole or a substituted triazine ultraviolet absorber, and a hindered amine radical scavenger.

Example 1 Preparation of Ultralow-Gloss Toughening Modifiers

The components and parts by weight of an ultralow-gloss toughening modifier (D) are shown in Table 1. Post-treated polymer microspheres (A), a low-temperature toughening agent (B), a coupling agent (C) and 0.3 phr of antioxidant IG-1076 were placed in an internal mixer for mixing to obtain ultralow-gloss toughening modifiers D1 to D10.

The mixing was conducted at 200-300° C. for 10-30 min.

TABLE 1

Ultralow-gloss Toughening Modifiers

| Component | D1 | D2 | D3 | D4 | D5 | D6 | D7 | D8 | D9 | D10 | D11 | D12 | D13 |
|---|---|---|---|---|---|---|---|---|---|---|---|---|---|
| Component A-1 | 70 | / | / | / | / | 70 | 50 | 80 | 40 | 90 | / | / | / |
| Component A-2 | / | 70 | / | / | / | / | / | / | / | / | / | / | / |
| Component A-3 | / | / | 70 | / | / | / | / | / | / | / | / | / | / |
| Component A-4 | / | / | / | 70 | / | / | / | / | / | / | / | / | / |
| Component A-5 | / | / | / | / | 70 | / | / | / | / | / | / | / | / |
| Component A-6 | / | / | / | / | / | / | / | / | / | / | 70 | / | / |
| Component A-7 | / | / | / | / | / | / | / | / | / | / | / | 70 | / |
| Component A-8 | / | / | / | / | / | / | / | / | / | / | / | / | 70 |
| Component B-1 | 20 | 20 | 20 | 20 | 20 | / | 30 | 15 | 40 | 5 | 20 | 20 | 20 |
| Component B-2 | / | / | / | 1 | / | 20 | / | / | / | / | / | / | / |
| Component C-1 | 10 | 10 | 10 | 10 | 10 | 10 | 20 | 5 | 20 | 5 | 10 | 10 | 10 |
| Antioxidant | 0.3 | 0.3 | 0.3 | 0.3 | 0.3 | 0.3 | 0.3 | 0.3 | 0.3 | 0.3 | 0.3 | 0.3 | 0.3 |

In Table 1,
Component A-1: Plasma-treated PTFE microspheres (0.8-2 μ in diameter) with a weight loss of 1 wt %.
Component A-2: Plasma-treated PTFE microspheres (0.8-2 μ in diameter) with a weight loss of 0.5 wt %.
Component A-3: Plasma-treated PTFE microspheres (0.8-2 μ in diameter) with a weight loss of 2.0 wt %.
Component A-4: Plasma-treated PTFE microspheres (0.8-2 μ in diameter) with a weight loss of 0.4%.
Component A-5: Plasma-treated PTFE microspheres (0.8-2 μ in diameter) with a weight loss of 2.1%.
Component A-6: Plasma-treated PAI microspheres (0.8-2 μ in diameter) with a weight loss of 1 wt %.
Component A-7: Plasma-treated PEI microspheres (0.8-2 μ in diameter) with a weight loss of 1 wt %.
Component A-8: Plasma-treated PPTA microspheres (0.8-2 μ in diameter) with a weight loss of 1 wt %.
Component B-1: EMA-g-GMA, GMA graft ratio 8%, AX8900.
Component B-2: EMA, LOTRYL ® 24MA005.
Component C-1: silane coupling agent, KH-550.

Examples 2-10. Preparation of Ultralow-Gloss, Ultra-Low Temperature Resistant PC/ABS Resin Composition Examples 2 to 10 provide an ultralow-gloss PC/ABS resin composition and a preparation method thereof, the components and weight percentage contents in the ultralow-gloss PC/ABS resin composition are as shown in Table 2. The preparation method includes: a mixture of 40-80 parts by weight of bisphenol A polycarbonate, 19-40 parts by weight of acrylonitrile-butadiene-styrene graft copolymer, 1-20 parts by weight of ultralow-gloss low temperature resistant modifier, and 0.1 to 5 parts by weight of processing aid is stirred and mixed in a high-speed mixer, and fed into a twin-screw extruder through a metering device; under the conveying, shearing and mixing of the screw, materials are melted, compounded, followed by extruding, stripping, cooling, and pelletizing, to obtain the ultralow-gloss PC/ABS resin composition.

Here, the twin-screw extruder has a screw length-to-diameter ratio of 36-44; the twin-screw extruder is provided with a temperature control device and an evacuation means; the twin-screw extruder has an extrusion temperature of 230-280° C. and a screw speed of 300-800 rpm.

Example 11

The example provides an ultralow-gloss PC/ABS resin composition and a preparation method thereof, which has basically the same components and formulations as Example 2, except that this example uses D11 instead of D1. The preparation method is the same as that in Example 2.

Example 12

The example provides an ultralow-gloss PC/ABS resin composition and a preparation method thereof, which has basically the same components and formulations as Example 2, except that this example uses D12 instead of D1. The preparation method is the same as that in Example 2.

Example 13

The example provides an ultralow-gloss PC/ABS resin composition and a preparation method thereof, which has basically the same components and formulations as Example 2, except that this example uses D13 instead of D1. The preparation method is the same as that in Example 2.

Comparative Examples 1-9

The present Comparative Examples 1 to 9 provide an ultralow-gloss PC/ABS resin composition and a preparation method thereof, and the components and the percentage by weight of the ultralow-gloss and ultra-low temperature resistant PC/ABS resin composition are shown in Table 2. The preparation method includes:

a mixture of 40-80 parts by weight of bisphenol A polycarbonate, 19-40 parts by weight of acrylonitrile-butadiene-styrene graft copolymer, 1-20 parts by weight of ultralow-gloss low temperature resistant modifier, and 0.1 to 5 parts by weight of processing aid is stirred and mixed in a high-speed mixer, and fed into a twin-screw extruder through a metering device; under the conveying, shearing and mixing of the screw, materials are melted, compounded, followed by extruding, stripping, cooling, and pelletizing, to obtain the ultralow-gloss PC/ABS resin composition.

Here, the twin-screw extruder has a screw length-to-diameter ratio of 36-44; the twin-screw extruder is provided with a temperature control device and an evacuation means; the twin-screw extruder has an extrusion temperature of 230-280° C. and a screw speed of 300-800 rpm.

TABLE 2

Material Formulations of the Examples and Comparative Examples

| Component | Example 2 | Example 3 | Example 4 | Example 5 | Example 6 | Example 7 | Example 8 | Example 9 | Example 10 |
|---|---|---|---|---|---|---|---|---|---|
| E-1 | 70 | 70 | 70 | 40 | 80 | 70 | 70 | 60 | 70 |
| E-2 | / | / | / | / | / | / | / | / | / |
| F-1 | 20 | 20 | 20 | 40 | 19 | 20 | 20 | 20 | 19 |
| D1 | 10 | / | / | 20 | / | / | / | 20 | 11 |
| D2 | / | 10 | / | / | / | / | / | / | / |
| D3 | / | / | 10 | / | / | / | / | / | / |
| D4 | / | / | / | / | / | / | / | / | / |
| D5 | / | / | / | / | / | / | / | / | / |
| D6 | / | / | / | / | / | / | / | / | / |
| D7 | / | / | / | / | / | 10 | / | / | / |
| D8 | / | / | / | / | / | / | 10 | / | / |
| D9 | / | / | / | / | / | / | / | / | / |
| D10 | / | / | / | / | / | / | / | / | / |
| Processing aid | 0.9 | 0.9 | 0.9 | 0.9 | 0.9 | 0.9 | 0.9 | 0.9 | 0.9 |

Material Formulations of the Examples and Comparative Examples

| Component | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| E-1 | 70 | 70 | 70 | 70 | 70 | 30 | 90 | / | 70 |
| E-2 | / | / | / | / | / | / | / | 70 | / |
| F-1 | 20 | 20 | 20 | 20 | 20 | 50 | 9 | 20 | 30 |
| D1 | / | / | / | / | / | 20 | 1 | 10 | / |
| D2 | / | / | / | / | / | / | / | / | / |
| D3 | / | / | / | / | / | / | / | / | / |
| D4 | 10 | / | / | / | / | / | / | / | / |
| D5 | / | 10 | / | / | / | / | / | / | / |
| D6 | / | / | 10 | / | / | / | / | / | / |
| D7 | / | / | / | / | / | / | / | / | / |
| D8 | / | / | / | / | / | / | / | / | / |
| D9 | / | / | / | 10 | / | / | / | / | / |
| D10 | / | / | / | / | 10 | / | / | / | / |
| Processing aid | 0.9 | 0.9 | 0.9 | 0.9 | 0.9 | 0.9 | 0.9 | 0.9 | 0.9 |

In Table 2,
Component E-1: bisphenol A polycarbonate has a relative molecular weight of 24,000 g/mol, a glass transition temperature of 150° C., and a terminal hydroxyl group content of 13%.
Component E-2: bisphenol A polycarbonate has a relative molecular weight of 24,000 g/mol, a glass transition temperature of 150° C., and a terminal hydroxyl group content of 8%.
Component F-1: the acrylonitrile-butadiene-styrene graft copolymer has a butadiene content of 14% by weight, an acrylonitrile content of 24% by weight, and a styrene content of 62% by weight, with a relative molecular weight of 100,000.

The processing aid is 0.5 phr of lubricant bis (octadecanol) pentaerythritol diphosphite and the antioxidant is 0.4 phr of commercially available hindered monophenol, bisphenol or polyphenol compound.

According to the PC/ABS resin compositions prepared in Examples 2 to 7 and Comparative Examples 1 to 9, test splines are prepared according to the same injection molding conditions, and the specific mechanical property test and gloss evaluation test items are as follows:

Tensile strength: tested according to ISO527 standard, test speed was 50 mm/min;

Bending strength: tested according to ISO178 standard, the test speed was 2 mm/min;

Flexural modulus: tested according to ISO178 standard, test speed was 1 mm/min;

Notched Izod impact strength at 23° C.: tested according to ISO180 standard, spline thickness was 4 mm;

Notched Izod impact strength at −30° ° C.: tested according to ISO180 standard, spline thickness was 4 mm, and test conditions were −30° C./4 h;

Gloss: The surface gloss of 3 mm thick plain swatches and K31 matte swatches was tested at 60° C. using a Garden Gloss Meter according to ASTM D523 and recorded in gloss units (GU), where the gloss of standard black glass sheets was 100 GU.

The test results are shown in Table 3.

TABLE 3

Performance Test Results of the Examples

| Material performance | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|
| Tensile strength (MPa) | 60 | 58 | 60 | 61 | 62 | 58 | 62 | 63 | 61 | 58 | 56 | 62 |
| Flexural modulus (MPa) | 2320 | 2312 | 2316 | 2451 | 2390 | 2308 | 2361 | 2436 | 2350 | 2308 | 2312 | 2350 |
| Notched Izod impact strength at 23° C. (KJ/m$^2$) | 50 | 45 | 48 | 52 | 51 | 62 | 45 | 53 | 48 | 52 | 53 | 50 |
| Notched Izod impact strength at −30° C. (KJ/m$^2$) | 25 | 23 | 24 | 23 | 26 | 30 | 23 | 25 | 24 | 26 | 26 | 24 |
| Gloss of plain swatches (GU) | 18 | 18 | 18 | 10 | 35 | 31 | 8 | 12 | 15 | 19 | 19 | 18 |
| Gloss of K31 matte swatches (GU) | 1.7 | 1.7 | 1.7 | 1.0 | 2.6 | 2.4 | 0.9 | 1.1 | 1.5 | 1.7 | 1.8 | 1.7 |

TABLE 4

Performance Test Results of the Comparative Examples

| Material performance | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Tensile strength (MPa) | 58 | 57 | 57 | 56 | 61 | 56 | 57 | 60 | 55 |
| Flexural modulus (MPa) | 2310 | 2292 | 2304 | 2220 | 2310 | 2285 | 2309 | 2321 | 2200 |
| Notched Izod impact strength at 23° C. (KJ/m$^2$) | 28 | 27 | 23 | 36 | 42 | 35 | 55 | 48 | 50 |
| Notched Izod impact strength at −30° C. (KJ/m$^2$) | 11 | 9 | 6 | 16 | 18 | 19 | 32 | 18 | 24 |

TABLE 4-continued

Performance Test Results of the Comparative Examples

| Material performance | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|
| Gloss of plain swatches (GU) | 19 | 18 | 17 | 36 | 16 | 18 | 46 | 18 | 82 |
| Gloss of K31 matte swatches (GU) | 1.8 | 1.7 | 1.7 | 4.0 | 1.6 | 1.8 | 5.3 | 1.8 | 6.2 |

From the test results of the examples and comparative examples in Table 3 and Table 4, it can be seen from Examples 2 to 10 and Comparative Example 9 that the present invention, adding an ultralow-gloss toughening modifier significantly reduces the gloss of the PC/ABS resin and maintains a high level of toughness, especially the level of low-temperature toughness, and the impact on other mechanical properties is not even obvious.

As can be seen from Examples 2, 5 to 6, 10 and Comparative Example 9, as the content of the ultralow-gloss toughening modifier increases, the gloss of both the plain swatches and the K31 matte swatches decreases, which indicates that the ultralow-gloss toughening agent can effectively reduce the gloss of the material while having little to none effect on the impact toughness and other mechanical properties of the material.

As can be seen from Examples 2 to 4, excessively high or low weight loss rate of the plasma-treated polymer microspheres has little effect on final gloss, but it seriously affect the toughness of the material and thus lead to substantially reduced impact resistance of workpieces.

As shown in Examples 2, 7, and 8, the gloss of the material is related to the components of the ultralow-gloss toughening agent, and more plasma-treated polymer microspheres in the ultralow-gloss toughening agent leads to lower surface gloss of the material when the addition amount is the same.

From Comparative Examples 4 to 5, adding too many or too little plasma-treated polymer microspheres in the ultralow-gloss toughening agent will have serious adverse effects: when the plasma-treated polymer microspheres are added in excess, in spite of low gloss, the toughness of the material is too low; the plasma-treated polymer microspheres are added in too small amount, in spite of excellent material toughness, the gloss becomes too high.

From Comparative Examples 1 to 2, when plasmas are used in treating PTFE microspheres, excessively high or low weight loss rate has little influence on the gloss of the material, but the toughness of the material is seriously deteriorated.

It can be seen from Comparative Example 3 that the toughness of the material will be significantly lower than that of ordinary PC/ABS if the toughening agent used does not contain a reactive functional group. Additionally, it can be seen from Comparative Examples 6 to 7 that the addition amount of PC further influences final properties of the material; if the addition amount of PC is too low, the material toughness will be insufficient, and if the addition amount is too high, the gloss will rise remarkably. From Comparative Example 8, the terminal hydroxyl content of the bisphenol A polycarbonate further influences the impact toughness of the final material.

In summary, the present invention uses and mixes plasma-treated polymer microspheres with a non-crosslinking reactive toughening agent, a silane coupling agent, and a processing aid in an internal mixer to prepare an ultralow-gloss toughening modifier, further preparing an ultralow-gloss low temperature resistant PC/ABS resin composition. The obtained PC/ABS resin composition has extremely low surface gloss and excellent low temperature toughness resistance, so that the present invention solves a problem that the low gloss and low temperature toughness of the PC/ABS resin are difficult to balance in the prior art. The PC/ABS resin composition prepared by the present invention has high low temperature toughness, and the notched Izod impact strength at −30° ° C. can reach about 25 KJ/m2; the low temperature toughness is comparable to that of the ordinary PC/ABS resin, so as to meet the requirements of low temperature storage of automobile parts and products. In addition, the PC/ABS resin prepared by the present invention has a soft and uniform matte effect while the gloss level can reach about 8, in contrast, the gloss level of K31 grain surface can only reach 0.9 or so. Therefore, the PC/ABS resin can also be used in some scenarios that requires low gloss level, and may even be used to replace the mold processing technology such as graining and texturing, which substantially saves mold costs and processing production costs.

Specific examples of the present invention have been described above. It is to be appreciated that the present invention is not limited to the specific examples described above, and various variations or modifications may be made by those skilled in the art within the scope of the claims, without having an influence on the substantive content of the present invention. The examples in the present application and the characteristics in the examples can be combined mutually in the case of no conflict.

What is claimed is:

1. An ultralow-gloss polycarbonate/acrylonitrile-butadiene-styrene (PC/ABS) resin composition, comprising the following first components:
 bisphenol A polycarbonate 40-80 parts by weight,
 acrylonitrile-butadiene-styrene graft copolymer 19-40 parts by weight,
 an ultralow-gloss toughening modifier 1-20 parts by weight, and
 a first processing aid 0.1-5 parts by weight,
 wherein the ultralow-gloss toughening modifier comprises the following second components:

post-treated polymer microspheres 50-80 parts by weight,
a low-temperature toughening agent 15-30 parts by weight,
a coupling agent 5-20 parts by weight, and
a second processing aid 0.1-5 parts by weight,
wherein the post-treated polymer microspheres are high performance special polymer microspheres, and the post-treated polymer microspheres are at least one selected from the group consisting of polytetrafluoroethylene (PTFE) microspheres, polyamide-imide (PAI) microspheres, polyetherimide (PEI) microspheres, and poly(p-phenylene terephthalamide) (PPTA) microspheres; and
wherein the post-treated polymer microspheres have a diameter of 0.8-2μ.

2. The ultralow-gloss PC/ABS resin composition according to claim 1, wherein the bisphenol A polycarbonate has a relative molecular weight of 17,000-30,000 g/mol, the bisphenol A polycarbonate has a glass transition temperature of 140-150° C., and the bisphenol A polycarbonate has a terminal hydroxyl group content of 10%-20%.

3. The ultralow-gloss PC/ABS resin composition according to claim 1, wherein the acrylonitrile-butadiene-styrene graft copolymer has a butadiene content of 10-55% by weight, the acrylonitrile-butadiene-styrene graft copolymer has an acrylonitrile content of 15-32% by weight, and the acrylonitrile-butadiene-styrene graft copolymer has a styrene content of 30-70% by weight; and the acrylonitrile-butadiene-styrene graft copolymer has a weight average molecular weight of 100,000-180,000 g/mol.

4. The ultralow-gloss PC/ABS resin composition according to claim 1, wherein the post-treated polymer microspheres are polymer microspheres, wherein the polymer microspheres are obtained after performing a plasma treatment on untreated polymer microspheres.

5. The ultralow-gloss PC/ABS resin composition according to claim 4, wherein the plasma treatment includes etching the untreated polymer microspheres through a plasma reactor under a reactive gas atmosphere by 0.5-2.0 wt % to obtain etched microspheres, and holding the etched microspheres in air for 1-5 min.

6. The ultralow-gloss PC/ABS resin composition according to claim 1, wherein the low-temperature toughening agent is a non-crosslinking reactive toughening agent, and the coupling agent is a silane coupling agent.

7. The ultralow-gloss PC/ABS resin composition according to claim 6, wherein the non-crosslinking reactive toughening agent is at least one selected from the group consisting of EMA-g-MAH, EMA-g-GMA, EBA-g-MAH, EBA-g-GMA, and thermoplastic styrene elastomer grafting active functional groups;
wherein the silane coupling agent is at least one selected from the group consisting of an amino functional silane coupling agent, a vinyl functional silane coupling agent, an epoxy functional silane coupling agent, and a methacryloyl functional silane coupling agent.

8. The ultralow-gloss PC/ABS resin composition according to claim 1, wherein a preparation method of the ultralow-gloss toughening modifier comprises the following steps:
weighing the second components in parts by weight, thoroughly mixing the second components uniformly and homogenizing the second components, to obtain the ultralow-gloss toughening modifier.

9. A method for preparing the ultralow-gloss PC/ABS resin composition according to claim 1, comprising the following steps:
step 1, preparing materials according to the following first components and contents: 40-80 parts by weight of the bisphenol A polycarbonate, 19-40 parts by weight of the acrylonitrile-butadiene-styrene graft copolymer, 1-20 parts by weight of ultralow-gloss-toughening modifier, and 0.1-5 parts by weight of the first processing aid;
step 2, stirring and mixing the materials in step 1 in a high-speed mixer to obtain mixed materials, and extruding and granulating the mixed materials to obtain the ultralow-gloss PC/ABS resin composition.

10. The ultralow-gloss PC/ABS resin composition according to claim 4, wherein a preparation method of the ultralow-gloss toughening modifier comprises the following steps:
weighing the second components in parts by weight, thoroughly mixing the second components uniformly and homogenizing the second components, to obtain the ultralow-gloss toughening modifier.

11. The ultralow-gloss PC/ABS resin composition according to claim 5, wherein a preparation method of the ultralow-gloss toughening modifier comprises the following steps:
weighing the second components in parts by weight, thoroughly mixing the second components uniformly and homogenizing the second components, to obtain the ultralow-gloss toughening modifier.

12. The ultralow-gloss PC/ABS resin composition according to claim 6, wherein a preparation method of the ultralow-gloss toughening modifier comprises the following steps:
weighing the second components in parts by weight, thoroughly mixing the second components uniformly and homogenizing the second components, to obtain the ultralow-gloss toughening modifier.

13. The ultralow-gloss PC/ABS resin composition according to claim 7, wherein a preparation method of the ultralow-gloss toughening modifier comprises the following steps:
weighing the second components in parts by weight, thoroughly mixing the second components uniformly and homogenizing the second components, to obtain the ultralow-gloss toughening modifier.

14. The method for preparing the ultralow-gloss PC/ABS resin composition according to claim 9, wherein the bisphenol A polycarbonate has a relative molecular weight of 17,000-30,000 g/mol, the bisphenol A polycarbonate has a glass transition temperature of 140-150° C., and the bisphenol A polycarbonate has a terminal hydroxyl group content of 10%-20%.

15. The method for preparing the ultralow-gloss PC/ABS resin composition according to claim 9, wherein the acrylonitrile-butadiene-styrene graft copolymer has a butadiene content of 10-55% by weight, the acrylonitrile-butadiene-styrene graft copolymer has an acrylonitrile content of 15-32% by weight, and the acrylonitrile-butadiene-styrene graft copolymer has a styrene content of 30-70% by weight; and the acrylonitrile-butadiene-styrene graft copolymer has a weight average molecular weight of 100,000-180,000 g/mol.

* * * * *